US010838069B2

(12) United States Patent
Kadelka et al.

(10) Patent No.: US 10,838,069 B2
(45) Date of Patent: Nov. 17, 2020

(54) METHOD TO INCREASE POSITIONING ACCURACY OF GLOBAL NAVIGATION SATELLITE SYSTEMS BY INTEGRATION OF CORRECTION SERVICE WITH A MOBILE COMMUNICATION NETWORK

(71) Applicant: Deutsche Telekom AG, Bonn (DE)

(72) Inventors: Arndt Kadelka, Cologne (DE); Johannes Springer, Kleinmachnow (DE)

(73) Assignee: DEUTSCHE TELEKOM AG, Bonn (DE)

( * ) Notice: Subject to any disclaimer, the term of this patent is extended or adjusted under 35 U.S.C. 154(b) by 341 days.

(21) Appl. No.: 15/597,193

(22) Filed: May 17, 2017

(65) Prior Publication Data

US 2017/0336512 A1    Nov. 23, 2017

(30) Foreign Application Priority Data

May 19, 2016  (EP) ..................................... 16170431

(51) Int. Cl.
*G01S 19/07*    (2010.01)
*H04W 64/00*   (2009.01)

(52) U.S. Cl.
CPC ............ *G01S 19/073* (2019.08); *G01S 19/07* (2013.01); *H04W 64/003* (2013.01); *H04W 64/00* (2013.01)

(58) Field of Classification Search
CPC ............................... G01S 19/07; H04W 64/00
(Continued)

(56) References Cited

U.S. PATENT DOCUMENTS 5,913,170 A * 6/1999 Wortham .............. G01S 5/0263
                                                           342/357.31
6,211,819 B1 * 4/2001 King ....................... G01S 19/05
                                                           342/357.42
(Continued)

FOREIGN PATENT DOCUMENTS

EP         1215508 A1 *  6/2002 ............. G01S 5/009
EP         1215508 A1     6/2002
(Continued)

OTHER PUBLICATIONS

Gerhard Wübbena et al: "Network-Based Techniques for RTK Applications", GPS Society-16, Nov. 14, 2001 (Nov. 14, 2001), XP055590691.

*Primary Examiner* — Chuong P Nguyen
(74) *Attorney, Agent, or Firm* — Leydig, Voit & Mayer, Ltd.

(57) ABSTRACT

A method for improving positioning accuracy of global navigation satellite systems includes: in a first step, a reference station located at a base station of a mobile communication network receives at least a first satellite signal transmitted from a global navigation satellite system; in a second step, subsequent to the first step, a server of the mobile communication network calculates correction information based on the first satellite signal received by the reference station; in a third step, subsequent to the second step, the correction information is transmitted to a mobile user equipment entity from a base station of the mobile communication network; in a fourth step, the mobile user equipment entity receives a second satellite signal transmitted from the global navigation satellite system; and in a fifth step, subsequent to the third step, the position of the mobile user equipment entity is calculated based on the correction information and the second satellite signal.

19 Claims, 2 Drawing Sheets

(58) Field of Classification Search
USPC .................................................. 342/357.44
See application file for complete search history.

(56) References Cited

U.S. PATENT DOCUMENTS

| | | | | |
|---|---|---|---|---|
| 6,236,359 | B1 * | 5/2001 | Watters | G01S 5/14 342/357.29 |
| 6,415,154 | B1 * | 7/2002 | Wang | G01S 5/0036 342/357.27 |
| 6,728,545 | B1 * | 4/2004 | Belcea | G01S 5/0284 342/357.64 |
| 6,748,226 | B1 * | 6/2004 | Wortham | G01S 5/0263 342/357.31 |
| 6,771,625 | B1 * | 8/2004 | Beal | G01S 5/0027 370/336 |
| 6,861,980 | B1 * | 3/2005 | Rowitch | G01S 19/05 342/357.31 |
| 7,126,527 | B1 * | 10/2006 | Bajikar | G01S 19/04 342/357.27 |
| 7,292,938 | B2 * | 11/2007 | Kimura | G01S 19/25 342/357.64 |
| 7,623,871 | B2 * | 11/2009 | Sheynblat | G01S 1/026 342/357.31 |
| 7,720,601 | B2 * | 5/2010 | Zhao | H04B 1/66 342/357.42 |
| 7,917,156 | B2 * | 3/2011 | Sheynblat | G01S 1/026 455/456.1 |
| 9,286,490 | B2 * | 3/2016 | Raghupathy | G06F 21/629 |
| 10,101,458 | B2 * | 10/2018 | Carter | G01S 19/05 |
| 10,571,578 | B2 * | 2/2020 | Sun | G01S 19/46 |
| 2004/0029583 | A1 * | 2/2004 | Yamamoto | G01S 19/06 455/427 |
| 2005/0208953 | A1 * | 9/2005 | Lee | H04B 7/18554 455/456.1 |
| 2005/0288033 | A1 * | 12/2005 | McNew | G01S 5/021 455/456.1 |
| 2009/0233622 | A1 * | 9/2009 | Johnson | H04W 64/00 455/456.3 |
| 2010/0060514 | A1 * | 3/2010 | Wang | G01S 19/258 342/357.43 |
| 2018/0120445 | A1 * | 5/2018 | Dill | G01S 19/04 |

FOREIGN PATENT DOCUMENTS

| | | | | |
|---|---|---|---|---|
| GB | | 2264837 A | * 9/1993 | ............ G01C 21/28 |
| GB | | 2264837 A | 9/1993 | |
| WO | WO 9615636 A1 | | 5/1996 | |

* cited by examiner

METHOD TO INCREASE POSITIONING ACCURACY OF GLOBAL NAVIGATION SATELLITE SYSTEMS BY INTEGRATION OF CORRECTION SERVICE WITH A MOBILE COMMUNICATION NETWORK

CROSS-REFERENCE TO RELATED APPLICATIONS

Priority is claimed to European Patent Application No. EP 16 170 431.7, filed on May 19, 2016, the entire disclosure of which is hereby incorporated by reference herein.

FIELD

The present invention relates to a method to increase positioning accuracy of global navigation satellite systems. The present invention further relates to a mobile communication network for increasing positioning accuracy of global navigation satellite systems.

BACKGROUND

Global navigation satellite systems (GNSS) are widely used for autonomous geo-spatial positioning. Global navigation satellite systems that are currently in service include Global Positioning System (GPS) and GLONASS. There are further global navigation satellite systems emerging, e.g. Galileo and BeiDou/COMPASS. For civil use those GNSS provide basic positioning services with positioning accuracy in the range of 5 to 15 m under good conditions.

Currently there are several methods available to increase positioning accuracy of mobile user equipment in GNSS. Those methods are known as differential GPS (D-GPS) or real time kinematic (RTK) systems. The available methods rely on providing correction information which is gathered using a reference station. The reference station receives a satellite signal transmitted from a satellite of a GNSS and calculates its position using the received signal. For example, the reference station may receive two satellite signals of two transmit bands (L1 and L2) and those satellite signals may be compared for calculating the position of the reference station. The calculated position is compared with the known true position of the reference station and correction information is determined to correct for potential deviations in position. The correction information can be sent to the mobile user equipment which utilized the correction information to correct its position.

In network-based RTK (Net-RTK) a plurality of reference stations is used to determine the correction information. The correction information is then transmitted to the mobile user equipment via a point-to-point connection, e.g. using a mobile communication network. With Net-RTK positioning accuracy within the range of 2 to 3 cm may be achieved. However, such a service requires rather high efforts for installing and maintaining reference stations. This limits the expansion of Net-RTK infrastructure and leads to rather low coverage of the service.

SUMMARY

In an exemplary embodiment, the present invention provides a method for improving positioning accuracy of global navigation satellite systems. The method includes: in a first step, a reference station located at a base station of a mobile communication network receives at least a first satellite signal transmitted from a global navigation satellite system; in a second step, subsequent to the first step, a server of the mobile communication network calculates correction information based on the first satellite signal received by the reference station; in a third step, subsequent to the second step, the correction information is transmitted to a mobile user equipment entity from a base station of the mobile communication network; in a fourth step, the mobile user equipment entity receives a second satellite signal transmitted from the global navigation satellite system; and in a fifth step, subsequent to the third step, the position of the mobile user equipment entity is calculated based on the correction information and the second satellite signal.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
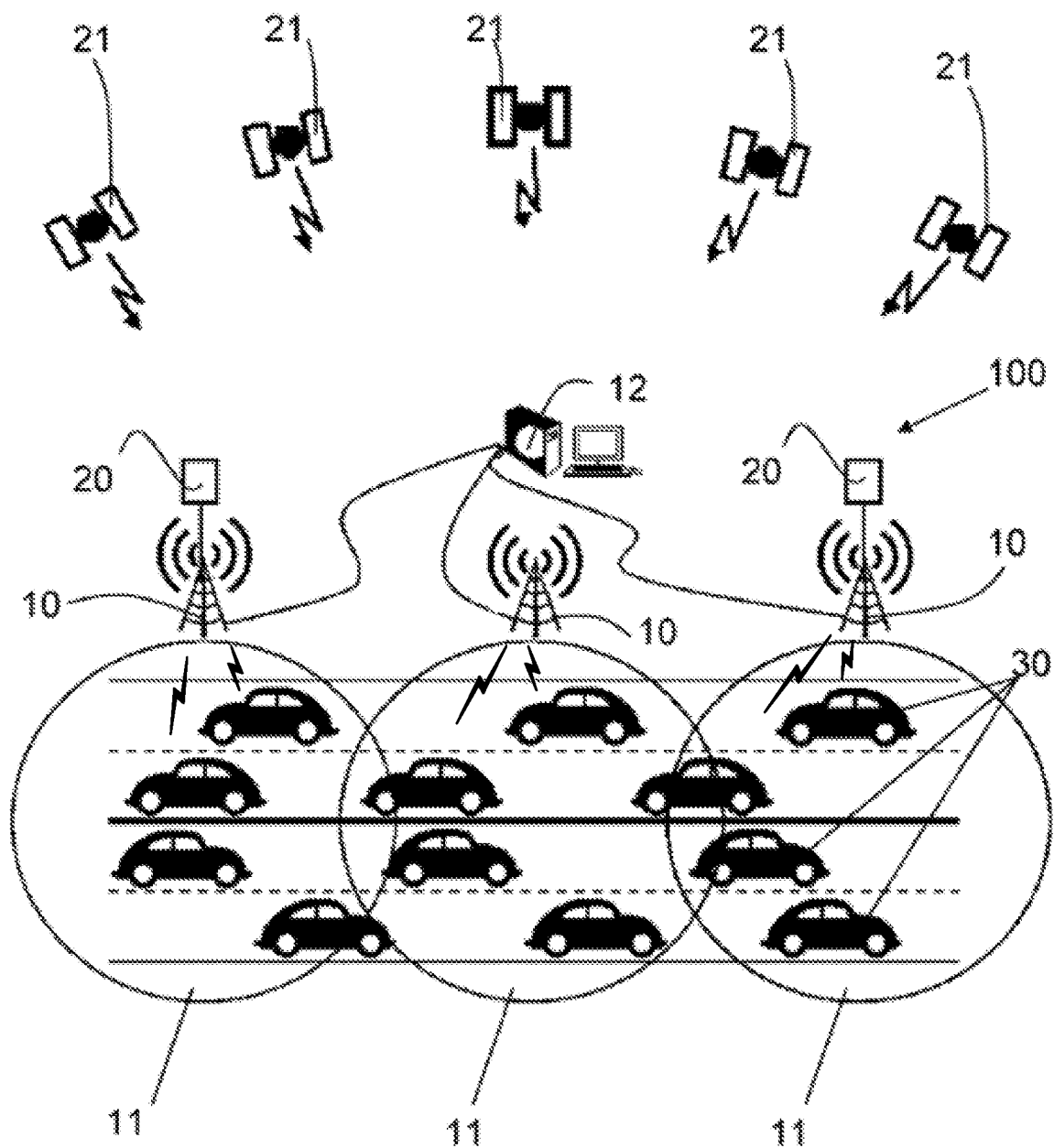
FIG. 1 schematically illustrates an embodiment of a mobile communication network according to the present invention.

Exemplary embodiments of the present invention provide for reduced efforts for installing and maintaining infrastructure while providing increased positioning accuracy for global navigation satellite systems.

In an exemplary embodiment, the present invention provides a method to increase positioning accuracy of global navigation satellite systems, wherein the method comprises the following steps:

in a first step, a reference station located at a base station of a mobile communication network receives at least a first satellite signal transmitted from a satellite of a global navigation satellite system;

in a second step, subsequent to the first step, a server of the mobile communication network calculates correction information based on the first satellite signal received by the reference station;

in a third step, subsequent to the second step, the correction information is transmitted to a mobile user equipment entity from a base station of the mobile communication network;

in a fourth step, the mobile user equipment entity receives a second satellite signal transmitted from a satellite of the global navigation satellite system;

in a fifth step, subsequent to the third step, the position of the mobile user equipment entity is calculated based on the correction information and the second satellite signal.

In a further exemplary embodiment, the present invention provides a mobile communication network for increasing positioning accuracy of global navigation satellite systems, wherein the mobile communication network comprises:

a base station and a reference station located at the base station, the reference station being configured to receive at least a first satellite signal transmitted from a satellite of a global navigation satellite system;

a server, the server being configured to calculate correction information based on the first satellite signal received by the reference station;

wherein the base station is configured to transmit the correction information to a mobile user equipment entity;

a mobile user equipment entity being configured to receive a second satellite signal transmitted from a satellite of the global navigation satellite system and to a calculate the position of the mobile user equipment entity based on the correction information and the second satellite signal.

By co-locating the reference station at the site of the base station of the mobile communication network the infrastructure of the base station can be reused thereby reducing installation efforts. Efforts for maintenance of the reference station can be drastically reduced by servicing both the base station and co-located reference station with the same resources. Efforts for setting up the system are further reduced by employing a server of the mobile communication network for calculating correction information based on the satellite signal received by the reference station and preferably additionally based on known position coordinates of the reference station. The server may be located at a base station of the mobile communication network, e.g. the very same base station the reference station is located at, or at a location remote from the base station. In case the server is located remote, the mobile network communication infrastructure may be reused to transfer data from the reference station to the server. The mobile communication network, in particular a base station of the mobile communication network, is employed to transmit the correction information to the mobile user equipment entity of the user of the global navigation satellite system. The transmitting base station may be the very same base station the reference station is located at or another base station of the mobile communication network. The correction information is then used to correct the position calculated by the mobile user equipment entity.

Exemplary embodiments of the method and the mobile communication network according to the invention may provide services for increasing positioning accuracy of global navigation satellite systems while reducing efforts for installation and maintenance of components. It is thereby possible to advantageously offer services for increasing positioning accuracy of global navigation satellite systems with higher area coverage (e.g. suitable for autonomous driving cars or agricultural machines).

According to a preferred embodiment of the method according to the present invention, in the first step, a plurality of reference stations each located at a base station of the communication network receive first satellite signals transmitted from one or more satellites of the global navigation satellite system; and, in the second step, the server calculates correction information based on the first signals received by the plurality of reference stations. The mobile communication network according to the present invention preferably comprises a plurality of base stations and a plurality of reference stations each located at a base station of the communication network, each reference station being configured to receive first satellite signals transmitted from one or more satellites of the global navigation satellite system and the server being configured to calculate correction information based on the first signals received by the plurality of reference stations.

Thereby, it is advantageously possible to provide a network of reference stations located at base stations of the mobile communication network with higher density than prior art Net-RTK installations. Consequently, correction information may be determined with increased spatial resolution.

According to a preferred embodiment of the method according to the present invention, in the third step, the correction information is transmitted from the base station to a plurality of mobile user equipment entities as a broadcast message.

Thereby, it is advantageously possible to address a plurality of mobile user equipment entities with the broadcast message. It is not required to establish point-to-point connections to a plurality of user equipment entities. Increasing the number of mobile user equipment entities to be served will not be limited by network capacity. It is rather possible to avoid scalability problems.

According to a preferred embodiment of the method according to the present invention, the correction information is transmitted from the base station to a plurality of mobile user equipment entities in the same radio cell.

Thereby, it is advantageously possible to serve a plurality of mobile user equipment entities in spatial proximity. Due to the entities being close to each other they are likely to share the same correction information. The correction information for the radio cell may be calculated using the satellite signal received by the reference station located at a base station assigned to the same radio cell. Alternatively, the correction information may be interpolated based on satellite signals received by reference stations located at other base stations assigned to other radio cells.

According to a preferred embodiment of the method according to the present invention, the correction information is transmitted from a plurality of base stations to a plurality of user equipment entities in a plurality of radio cells.

Thereby, it is advantageously possible to serve a plurality of mobile user equipment entities in a region spanning more than one radio cell. The correction information for this region may be calculated using the satellite signal received by the reference station located at a base station assigned to one of the radio cells inside the region. Alternatively, the correction information may be interpolated based on satellite signals received by reference stations located at a plurality of base stations assigned to radio cells inside the region.

According to a preferred embodiment of the method according to the present invention, the correction information is a common correction information; in the fourth step, the mobile user equipment entities each receive a second satellite signal transmitted from a satellite of the global navigation satellite system; and, in the fifth step, the position of each of the mobile user equipment entities is calculated based on the common correction information and the second satellite signal.

Thereby, it is advantageously possible to serve a plurality of mobile user equipment entities with identical correction information.

According to a preferred embodiment of the method according to the present invention, the correction information is a correction map, including location dependent correction information, in particular for locations in the same radio cell; in the fourth step, the mobile user equipment entities each receive a second satellite signal transmitted from a satellite of the global navigation satellite system; and, in the fifth step, the position of each of the mobile user equipment entities is calculated based on the correction map and the second satellite signal.

Thereby, it is advantageously possible to serve a plurality of mobile user equipment entities with identical correction information in the form of map. However, the mobile user equipment entities may derive location specific correction information for their individual location. Based on the location specific correction information the position of the user equipment entity will be calculated. Thus, uniform position accuracy may be established within the plurality of mobile user equipment entities receiving the same correction map.

According to a preferred embodiment of the method according to the present invention, in the third step, individual correction information is transmitted from the base station to each of a plurality of mobile user equipment entities.

Thereby, it is advantageously possible to enable individual position correction for each of the mobile user equipment entities, e.g. based on edge computing. The individual correction information may be determined by a processing device located at the transmitting base station or the reference station attached to it.

According to a preferred embodiment of the mobile communication network, the mobile communication network comprises a plurality of servers being configured to calculate correction information based on the first satellite signal received by one or more reference stations.

Thereby it is advantageously possible to process and provide correction information for a singular base station based on satellite signals received at multiple reference stations or to process and provide correction information for a region comprising multiple radio cells, respectively. It is possible to assign each server to a radio cell or a region covering several radio cells. For example, each a server may be assigned to each radio cell in the mobile communication network.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 is depicted that is capable of increasing positioning accuracy of global navigation satellite systems, e.g. GPS, GLONASS, BeiDou/COMPASS and Galileo. The mobile communication network 100 comprises a plurality of base stations 10.

The base stations 10 each provide a radio cell 11 with network coverage so that a mobile user equipment 30 located in the radio cell 11 can communicate via the mobile communication network 100. In FIG. 1 the mobile user equipment 30 is symbolized by a vehicle. However, the mobile user equipment may alternatively be in the form of a mobile phone, a smartphone, a mobile computer or similar equipment.

The mobile communication network 100 further comprises a plurality of reference stations 20 each located at a base station 10 of the mobile communication network 100. The reference stations 20 are configured to receive first satellite signals transmitted from one or more satellites 21 of the global navigation satellite system in one or more transmit bands (L1 and L2). Reference stations 20 are not located at each base station 10 of the mobile communication network 100. As shown in FIG. 1, the base station 10 depicted on the right and the base station 10 depicted on the left have a reference station 20 attached while the base station 10 in the middle does not have a reference station 20 attached to it. Alternatively, the mobile communication network 100 may be designed such that a reference station 20 is located at each base station 10 of the network, thereby achieving a density of reference stations 20 that is identical to the density of base stations 10.

A further component of the mobile communication network 100 is a server 12 which is configured to calculate correction information based on the first satellite signal received by the reference stations 20 and on known position coordinates of the reference stations 20. The server may be located at one of the base stations 10 of the mobile communication network. Alternatively, the server may be implemented as a centralized server located remote from the base stations 10. The correction information is sent to the base stations 10, which are configured to transmit the correction information to the mobile user equipment 30.

According to yet another alternative embodiment multiple servers may be applied. Thereby servers may process and provide correction information for a singular base station, e.g. edge computing, or may serve a wider region of base stations and radio cells, respectively.

Figure 2:
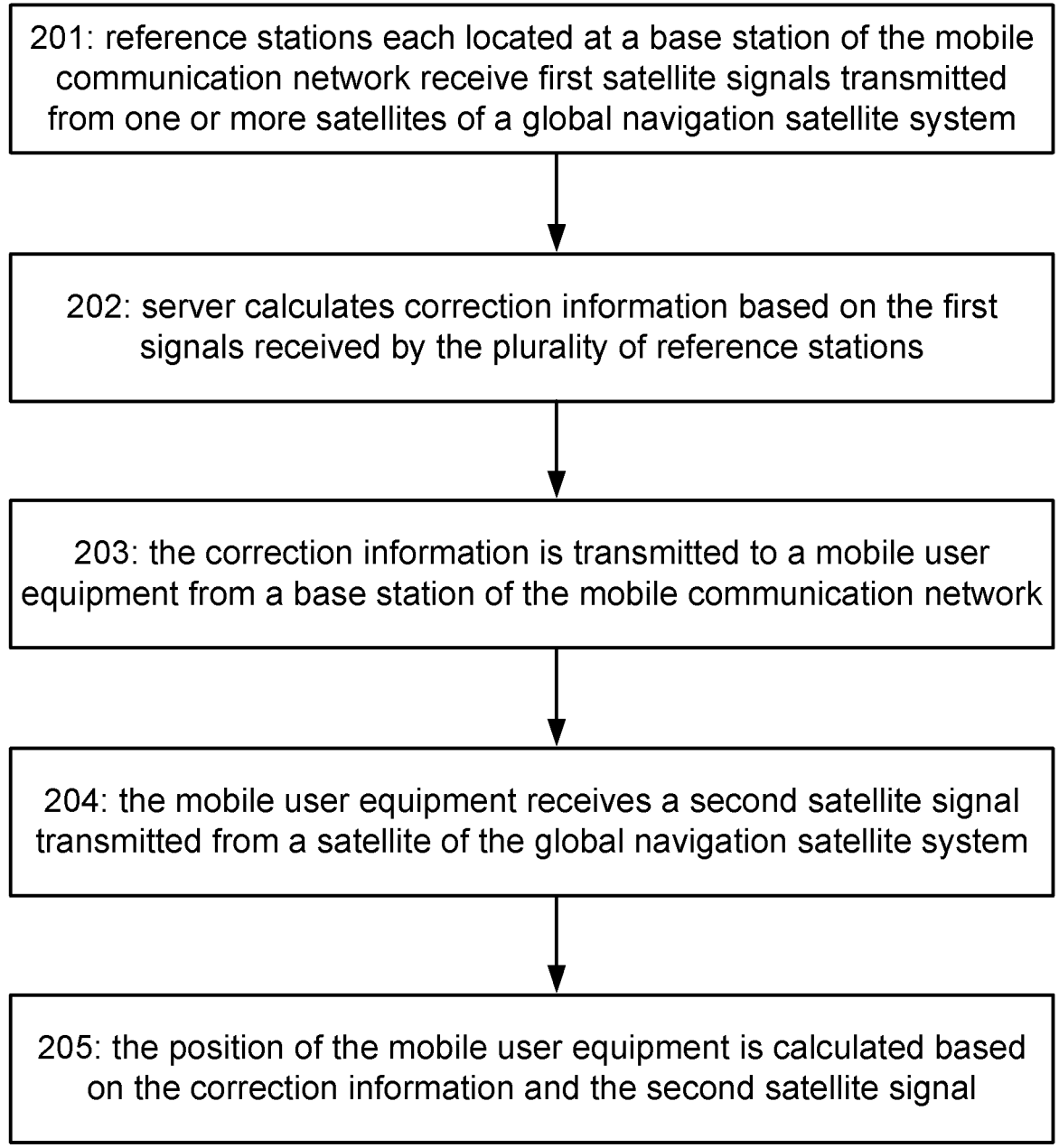
FIG. 2 schematically illustrates an embodiment of a method according to the present invention.

FIG. 2 depicts an embodiment of the method to increase positioning accuracy of global navigation satellite systems according to the invention. The method, comprises the following steps:

in a first step 201, the reference stations 20 each located at a base station 10 of the mobile communication network 100 receive first satellite signals transmitted from one or more satellites 21 of the global navigation satellite system;

in a second step 202, subsequent to the first step, the server 12 calculates correction information based on the first signals received by the plurality of reference stations 20;

in a third step 203, subsequent to the second step, the correction information is transmitted to a mobile user equipment 30 from a base station 10 of the mobile communication network 100;

in a fourth step 204, the mobile user equipment 30 receives a second satellite signal transmitted from a satellite 21 of the global navigation satellite system;

in a fifth step 205, subsequent to the third step, the position of the mobile user equipment 30 is calculated based on the correction information and the second satellite signal.

Correction information may vary depending on the position of the mobile user equipment 30. Thus, in the second step, correction information is calculated on a per radio cell 11 basis. In other words, the server 12 calculates individual correction information for each radio cell 11 of the mobile communication network 100. The correction information assigned to an individual radio cell 11 may be determined based on the first satellite signal received by the reference station located at the base station 10 of the radio cell 11 in question. Alternatively, correction information for the radio cell 11 is determined by interpolating correction information of neighboring radio cells 11 or based on the first satellite signals received by reference stations 20 located at base stations 10 of neighboring radio cells 11. In particular, such a determination by interpolation is done in case that the radio cell 11 in question does not have a reference station located at its base station 10. Referring to the embodiment depicted in FIG. 1, the correction information for the radio cell 11 in the middle is determined either by interpolation of the correction information for the left and right radio cells 11 or based on the satellite signals received by the right and left reference stations 20.

However, correction information for a radio cell 11 may be determined by interpolating correction information for the radio cell 11 in question and a correction information of neighboring radio cells 11. For example, the correction information for a given radio cell 11 may be determined based on the satellite signals received by the reference station 20 arranged at the base station 10 of said radio cell 11 and additionally based on the satellite signals received by the reference stations 20 arranged at one or more base stations 10 of neighboring radio cells 11.

In the third step, the correction information is transmitted from the base stations 10 of the network 100 to a plurality of mobile user equipment entities as a broadcast message. Broadcasting of the correction information is implemented on a per radio cell 11 basis. Thus, a plurality of user equipment entities 30 (e.g. a closed user group) which are situated in the same radio cell 11 receive identical correction information transmitted by the respective base station 10. The distance between neighboring base stations may be in the range of 100 m up to 10 km.

The correction information broadcasted to the mobile user equipment entities 30 may be common correction information valid for all locations within the respective radio cell 11. In the fourth step, the mobile user equipment entities 30 each receive a second satellite signal transmitted from a satellite of the global navigation satellite system. In the fifth step, the position of each of the mobile user equipment entities 30 is calculated based on the common correction information and the second satellite signal. Calculation is preferably be done by a processing unit of the mobile user equipment entity 30. Thus, all the mobile user equipment entities 30 derive their position using the same correction information. This concept has the benefit of reducing algorithmic complexity. Because positioning accuracy is dependent on the distance of the mobile user equipment 30 from the reference station 20, however, the actual positioning accuracy degrades when increasing the spatial size of the radio cell 11.

According to an alternative embodiment of the method according to the invention, the correction information is a correction map, including location dependent correction information, in particular for locations in the same radio cell. Thus, each base station 10 may broadcast a correction map covering the area of the respective radio cell 11. In the fourth step, the mobile user equipment entities 30 each receive a second satellite signal transmitted from a satellite of the global navigation satellite system. The mobile user equipment entities 30 each calculate a preliminary position based on the received second signal. The mobile user equipment entities 30 determine their specific correction information based on the correction map and the preliminary position. Then, the preliminary position is refined by the correction information specific to the position of the mobile user equipment entity 30. In other words, the position of each of the mobile user equipment entities 30 is calculated based on the correction map and the second satellite signal. By using a correction map comprising individual correction information for the locations in side the radio cell 11, uniform positioning accuracy may be established for all mobile user equipment entities 30 within the radio cell 11.

According to an alternative embodiment of the inventive method, correction information is broadcasted to more than a single radio cell. Thus, common correction information may be transmitted to all mobile user equipment entities in a group of radio cells forming a region.

Alternatively, individual correction information is transmitted from the base stations 10 to each of a plurality of mobile user equipment entities 30. The individual correction information may be determined by a processing device located at the transmitting base station 10 or the reference station 20 attached to it.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A positioning method, comprising:
receiving, by a first reference station co-located with a first base station of a plurality of base stations of a mobile communication network, first satellite signals from a global navigation satellite system;
receiving, by a server of the mobile communication network, the first satellite signals from the first reference station;
determining, by the server, correction information corresponding to the first base station based on the first satellite signals and a known position of the first reference station;
sending, by the server, the correction information corresponding to the first base station to the first base station; and broadcasting, by the first base station, the correction information corresponding to the first base station to a first mobile user equipment located in a first radio cell corresponding to the first base station to facilitate the first mobile user equipment determining a position of the first mobile user equipment based on the correction information corresponding to the first base station and second satellite signals received by the first mobile user equipment from the global navigation satellite system.

2. The method according to claim 1, wherein the plurality of mobile user equipments to which the correction information corresponding to the first base station is broadcasted are in a same radio cell.

3. The method according to claim 1, wherein the server determines respective correction information for each of the plurality of base stations.

4. The method according to claim 1, further comprising:
receiving, by a second mobile user equipment of the plurality of mobile user equipments to which the correction information corresponding to the first base station is broadcasted, third satellite signals from the global navigation satellite system; and
determining, by the second mobile user equipment, a position of the second mobile user equipment based on the correction information corresponding to the first base station and the third satellite signals.

5. The method according to claim 1, wherein the correction information corresponding to the first base station comprises a correction map covering a radio cell corresponding to the first base station, including location-dependent correction information for locations in the radio cell corresponding to the first base station.

6. The method according to claim 1, further comprising:
receiving, by a second reference station co-located with a second base station of the plurality of base stations of the mobile communication network, third satellite signals from the global navigation satellite system;
receiving, by the server, the third satellite signals from the second reference station;
determining, by the server, correction information corresponding to the second base station based on the third satellite signals and a known position of the second reference station;
determining, by the server, correction information corresponding to a third base station of the plurality of base stations of the mobile communication network using the correction information corresponding to the first base station and the correction information corresponding to the second base station;
sending, by the server, the correction information corresponding to the third base station to the third base station; and
broadcasting, by the third base station, the correction information corresponding to the third base station to a second mobile user equipment located in a second radio cell corresponding to the third base station to facilitate the second mobile user equipment determining a position of the second mobile user equipment based on the correction information corresponding to the third base station and fourth satellite signals received by the second mobile user equipment from the global navigation satellite system.

7. The method according to claim 6, wherein determining the correction information corresponding to the third base station is based on interpolation.

8. The method according to claim 6, wherein the third base station does not have a co-located reference station.

9. A mobile communication network, comprising:
a plurality of base stations, including a first base station;
a plurality of mobile user equipments, including a first mobile user equipment located in a first radio cell corresponding to the first base station;
a plurality of reference stations, including a first reference station co-located with the first base station, wherein the first reference station is configured to receive first satellite signals from a global navigation satellite system; and
at least one server configured to:
receive the first satellite signals from the first reference station;
determine correction information corresponding to the first base station based on the first satellite signals and a known position of the first reference station; and
send the correction information to the first base station;
wherein the first base station is configured to broadcast the correction information corresponding to the first base station to the first mobile user equipment; and
wherein the first mobile user equipment is configured to:
receive second satellite signals from the global navigation satellite system; and
determine a position of the first mobile user equipment based on the correction information corresponding to the first base station and the second satellite signals.

10. The mobile communication network according to claim 9, wherein the at least one server comprises a plurality of servers.

11. The mobile communication network according to claim 9, wherein the at least one server is further configured to determine respective correction information for each of the plurality of base stations.

12. The mobile communication network according to claim 9, wherein the plurality of base stations further includes a second base station and a third base station;
wherein the plurality of reference stations further includes a second reference station co-located with the second base station;
wherein the plurality of mobile user equipments further includes a second mobile user equipment located in a second radio cell corresponding to the third base station;
wherein the second reference station is configured to receive third satellite signals from the global navigation satellite system;
wherein the at least one server is further configured to:
receive the third satellite signals from the second reference station;
determine correction information corresponding to the second base station based on the third satellite signals and a known position of the second reference station;
determine correction information corresponding to the third base station using the correction information corresponding to the first base station and the correction information corresponding to the second base station; and
send the correction information corresponding to the third base station to the third base station;
wherein the third base station is configured to broadcast the correction information corresponding to the third base station to the second mobile user equipment; and
wherein the second mobile user equipment is configured to:

receive fourth satellite signals from the global navigation satellite system; and determine a position of the second mobile user equipment based on the correction information corresponding to the third base station and the fourth satellite signals.

13. The mobile communication network according to claim 12, wherein determining the correction information corresponding to the third base station is based on interpolation.

14. The mobile communication network according to claim 12, wherein the third base station does not have a co-located reference station.

15. One or more non-transitory computer-readable mediums having processor-executable instructions stored thereon, wherein the processor-executable instructions, when executed, facilitate:

receiving, by a first reference station co-located with a first base station of a plurality of base stations of a mobile communication network, first satellite signals from a global navigation satellite system;

receiving, by a server of the mobile communication network, the first satellite signals from the first reference station;

determining, by the server, correction information corresponding to the first base station based on the first satellite signals and a known position of the first reference station;

sending, by the server, the correction information corresponding to the first base station to the first base station; and broadcasting, by the first base station, the correction information corresponding to the first base station to a first mobile user equipment located in a first radio cell corresponding to the first base station to facilitate the first mobile user equipment determining a position of the first mobile user equipment based on the correction information corresponding to the first base station and second satellite signals received by the first mobile user equipment from the global navigation satellite system.

16. The one or more non-transitory computer-readable mediums according to claim 15, wherein the processor-executable instructions, when executed, further facilitate:

determining, by the server, respective correction information for each of the plurality of base stations.

17. The one or more non-transitory computer-readable mediums according to claim 15, wherein the processor-executable instructions, when executed, further facilitate:

receiving, by a second reference station co-located with a second base station of the plurality of base stations of the mobile communication network, third satellite signals from the global navigation satellite system;

receiving, by the server, the third satellite signals from the second reference station;

determining, by the server, correction information corresponding to the second base station based on the third satellite signals and a known position of the second reference station;

determining, by the server, correction information corresponding to a third base station of the plurality of base stations of the mobile communication network using the correction information corresponding to the first base station and the correction information corresponding to the second base station;

sending, by the server, the correction information corresponding to the third base station to the third base station; and broadcasting, by the third base station, the correction information corresponding to the third base station to a second mobile user equipment located in a second radio cell corresponding to the third base station to facilitate the second mobile user equipment determining a position of the second mobile user equipment based on the correction information corresponding to the third base station and fourth satellite signals received by the second mobile user equipment from the global navigation satellite system.

18. The one or more non-transitory computer-readable mediums according to claim 17, wherein determining the correction information corresponding to the third base station is based on interpolation.

19. The one or more non-transitory computer-readable mediums according to claim 17, wherein the third base station does not have a co-located reference station.

* * * * *